O. F. ERICKSON AND H. P. OLSON.
BALANCED GEAR DRIVE FOR AUTOMOBILES.
APPLICATION FILED FEB. 5, 1920.

1,393,208.

Patented Oct. 11, 1921.

WITNESSES.
Peter Chas. Falk
B. H. French

INVENTORS.
OSCAR. F. ERICKSON.
HANS. P. OLSON.
BY Charles. Albert French
ATTORNEY.

UNITED STATES PATENT OFFICE.

OSCAR F. ERICKSON AND HANS P. OLSON, OF MADISON, WISCONSIN.

BALANCED-GEAR DRIVE FOR AUTOMOBILES.

1,393,208.        Specification of Letters Patent.        Patented Oct. 11, 1921.

Application filed February 5, 1920.  Serial No. 356,463.

*To all whom it may concern:*

Be it known that we, OSCAR F. ERICKSON and HANS P. OLSON, citizens of the United States, residing at Madison, in the county of Dane and State of Wisconsin, have invented certain new and useful Improvements in Balanced-Gear Drives for Automobiles, of which the following is a specification.

Our invention relates to a balanced gear drive for automobiles and the like; and the objects of our invention are, first, to balance the main bevel gear between two pinions in a manner to eliminate end thrust; second, to provide a double drive system, by employing a pair of spur gears in mesh with each other and secured to the pinion shafts so that the breaking of teeth in one or more of the gears in the train will not seriously effect the transmission of the power; and, third, to have the gears and housing convenient of access for repairing.

I attain these objects by the mechanism shown in the accompanying drawing in which—

Figure 1:
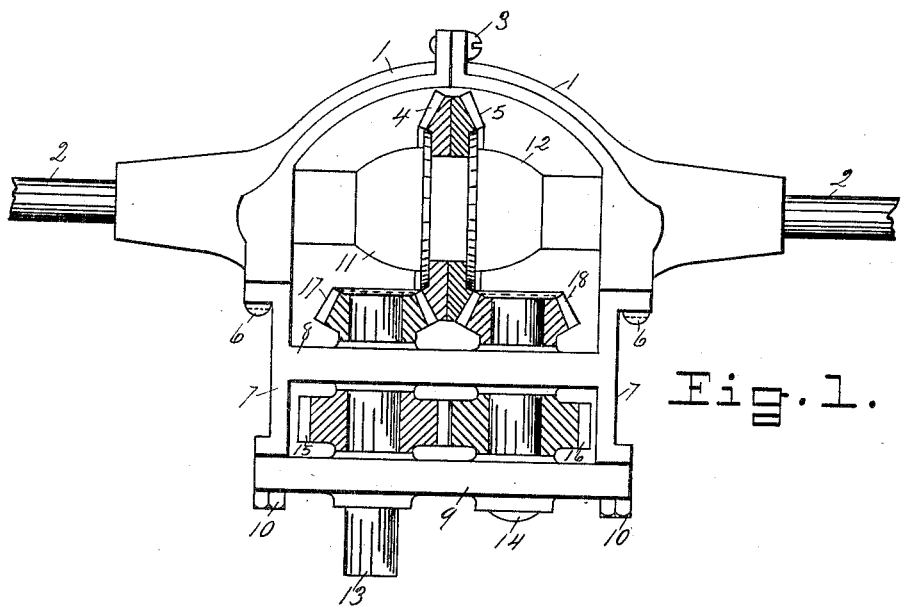
Figure 2:
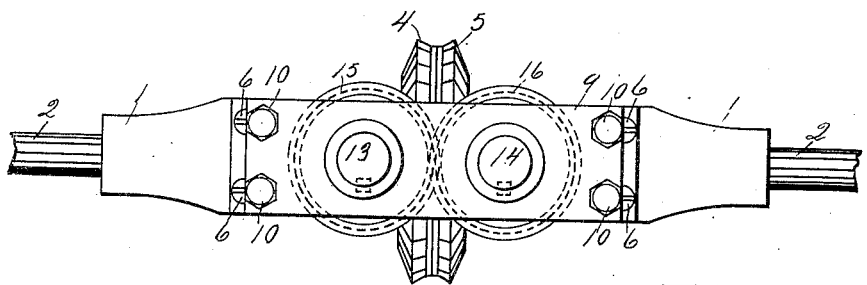

Figure 1, is a plan of the gears in section;
Fig. 2, is a front elevation.

Similar numerals refer to similar parts throughout the several views.

The main frame is of metal and comprises two members 1—1, each forming a bearing for the rear axles 2, thence curving backward and are secured together by the screws 3, thereby providing a yoke for the center support of the large bevel gears 4 and 5 of the train. To the front of the yoke a second frame is fastened by screws 6, comprising side rails 7, and a center beam 8, and a plate 9, is disposed across the front and secured to the side rails 7, by cap screws 10. The gears 4 and 5 are bevels turned back to back, and bolted together, and to the gears are secured bell shaped housings 11 and 12, which are revolubly mounted on the axles 2. In the beam 8, and plate 9, are bearings for the drive shaft 13, and auxiliary shaft 14. Spur gear 15, is secured to drive shaft 13, between the beam 8, and plate 9, and a spur gear 16, in mesh with gear 15, is secured to auxiliary shaft 14. Between the beam 8, and plate 9, to the inner ends of shafts 13 and 14, are secured bevel pinions 17 and 18, which are in mesh with the bevel gears 4 and 5 that are fastened to the housings 11 and 12, revolubly mounted on the rear axles 2, as aforesaid. Any connections may be employed for operating the rear axles from the housing, ordinary bevel gear differential, or pawls and ratchet, as this feature of the transmission is no part of our invention.

In our system, the power is applied to shaft 13, from the engine and directly through bevel pinion 17, to bevel gear 4, thence through spur gears 15 and 16 to the auxiliary shaft 14, and bevel pinion 18, to bevel gear 5, thereby balancing the thrust of the gears 4 and 5 thence to housings 11 and 12 and any convenient connection to the rear axles 2. It is evident that if spur gear 15 should be broken power would be transmitted through pinion 17 to gear 4, and if pinion 17 or gear 4 should be broken, power would be carried through gear 15 to 16 and 18 to gear 5.

Having thus described our invention we claim:

In a balanced gear drive, the combination of two bell-shaped housings loosely mounted on the driving axle, with two bevel gears secured together back to back and fastened to said housings and a frame comprising a yoke mounted on said driving axles, and divided midway, the two parts being secured together by bolts and a second frame secured to the first in which a drive and auxiliary shaft is journaled, said shafts connected by spur gears and carrying bevel pinions at their inner ends adapted to mesh with the bevel gears secured to the housings.

In testimony whereof we affix our signatures in the presence of two subscribing witnesses.

OSCAR F. ERICKSON.
HANS P. OLSON.

Witnesses:
FRANCES FRENCH,
PETER C. FALK.